US007884734B2

(12) United States Patent
Izadi et al.

(10) Patent No.: US 7,884,734 B2
(45) Date of Patent: Feb. 8, 2011

(54) UNIQUE IDENTIFICATION OF DEVICES USING COLOR DETECTION

(75) Inventors: Shahram Izadi, Cambridge (GB); Malcolm Hall, Glasgow (GB); Stephen E. Hodges, Cambridge (GB); William Buxton, Toronto (CA); David Alexander Butler, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 557 days.

(21) Appl. No.: 12/023,582

(22) Filed: Jan. 31, 2008

(65) Prior Publication Data

US 2009/0195402 A1 Aug. 6, 2009

(51) Int. Cl.
G08B 21/00 (2006.01)
(52) U.S. Cl. .............................. 340/686.6; 340/539.25; 340/10.1; 382/181; 702/150; 702/151; 702/152; 702/153
(58) Field of Classification Search .............. 340/686.6, 340/539.25, 10.1; 382/181; 702/150–153
See application file for complete search history.

(56) References Cited

U.S. PATENT DOCUMENTS

| 6,647,142 | B1 * | 11/2003 | Beardsley ................... 382/165 |
| 6,902,113 | B2 * | 6/2005 | Sali et al. ................ 235/462.04 |
| 7,262,792 | B2 * | 8/2007 | Shniberg et al. ............ 348/169 |
| 7,280,851 | B2 * | 10/2007 | Oba et al. ................... 455/566 |
| 7,339,484 | B2 * | 3/2008 | Pradhan et al. ............. 340/635 |
| 7,374,106 | B1 * | 5/2008 | Bromer ...................... 235/492 |
| 7,409,231 | B2 * | 8/2008 | Oba et al. ................... 455/566 |
| 2002/0183068 | A1 * | 12/2002 | Dunko et al. ................ 455/456 |
| 2005/0073575 | A1 * | 4/2005 | Thacher et al. ......... 348/14.13 |
| 2006/0152594 | A1 * | 7/2006 | Landschaft et al. .... 348/211.99 |
| 2006/0228025 | A1 * | 10/2006 | Yu et al. ...................... 382/181 |
| 2007/0123166 | A1 * | 5/2007 | Sheynman et al. ......... 455/41.2 |
| 2007/0182546 | A1 * | 8/2007 | Virk et al. .............. 340/539.13 |

(Continued)

FOREIGN PATENT DOCUMENTS

WO WO2006038071 A1 4/2006

OTHER PUBLICATIONS

Ballagas, et al., "Sweep and Point & Shoot: Phonecam-Based Interactions for Large Public Displays", ACM, 2005, pp. 1-4.

(Continued)

*Primary Examiner*—Benjamin C Lee
*Assistant Examiner*—Quang Pham
(74) *Attorney, Agent, or Firm*—Lee & Hayes, PLLC

(57) ABSTRACT

Methods and apparatus for uniquely identifying wireless devices in close physical proximity are described. When two wireless devices are brought into close proximity, one of the devices displays an optical indicator, such as a light pattern. This device then sends messages to other devices which are within wireless range to cause them to use any light sensor to detect a signal. In an embodiment, the light sensor is a camera and the detected signal is an image captured by the camera. Each device then sends data identifying what was detected back to the device displaying the pattern. By analyzing this data, the first device can determine which other device detected the indicator that it displayed and therefore determine that this device is in close physical proximity to it. In an example, the first device is an interactive surface arranged to identify the wireless addresses of devices which are placed on the surface.

20 Claims, 14 Drawing Sheets

U.S. PATENT DOCUMENTS

2007/0274270 A1* 11/2007 Jones et al. .................. 370/338
2009/0058819 A1* 3/2009 Gioscia et al. .............. 345/173

OTHER PUBLICATIONS

"Mitsubishi Electric Research Laboratories", at <<2. http:www.merl.com/projects/ProjectorCalib/>>, Mitsubishi Electric Research Laboratories, 2008, pp. 1.

Raskar, et al., "A Self Correcting Projector", Mitsubishi Electric Research Laboratories, Inc., Jan. 2002, pp. 1-7.

Scott, et al., "Using Visual Tags to Bypass Bluetooth Device Discovery", Mobile Computing and Communications Review, vol. 1, No. 2, pp. 1-12, 2005.

Wilson, et al., "BlueTable: Connecting Wireless Mobile Devices on Interactive Surfaces Using Vision-Based Handshaking", pp. 1-7, 2007.

PCT International Search Report dated May 29, 2009 from corresponding PCT Application No. PCT/US2008/088159 filed Dec. 23, 2008, 3 pages.

* cited by examiner

UNIQUE IDENTIFICATION OF DEVICES USING COLOR DETECTION

BACKGROUND

Most computing devices have wireless capability and in order for two devices to share data over a wireless link it is generally necessary to uniquely identify the two devices and to perform a pairing operation. Wireless devices are generally identified using their wireless ID (e.g. their Bluetooth name or MAC address) and in order to pair two devices, a first device searches for other devices which are visible over the wireless link and provides a list of possible wireless IDs to a user. The user then selects the particular wireless ID with which pairing is to occur. Dependent on the location and the range of the wireless technology used, there may be large numbers of possible devices discovered.

Interactive surfaces have been developed which provide a table top touch screen by which a user can interact with a computing device. A user may wish to connect a mobile device, such as a mobile telephone, with the interactive surface and as the interactive surfaces are touch sensitive they can detect when a mobile telephone or other object is placed on their surface. However, automatic synchronization of the interactive surface and the device can only occur if the device is physically augmented with a tag (e.g. an RFID tag) because the interactive surface cannot distinguish the device on its surface from other devices which are discovered over the wireless link. Alternatively, the list of discovered devices can be provided to the user for selection of the correct device (as described above) however this introduces user input into the synchronization process.

The embodiments described below are not limited to implementations which solve any or all of the disadvantages of known methods of pairing wireless devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and apparatus for uniquely identifying wireless devices in close physical proximity are described. When two wireless devices are brought into close proximity, one of the devices displays an optical indicator, such as a light pattern. This device then sends messages to other devices which are within wireless range to cause them to use any light sensor to detect a signal. In an embodiment, the light sensor is a camera and the detected signal is an image captured by the camera. Each device then sends data identifying what was detected back to the device displaying the pattern. By analyzing this data, the first device can determine which other device detected the indicator that it displayed and therefore determine that this device is in close physical proximity to it. In an example, the first device is an interactive surface arranged to identify the wireless addresses of devices which are placed on the surface.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
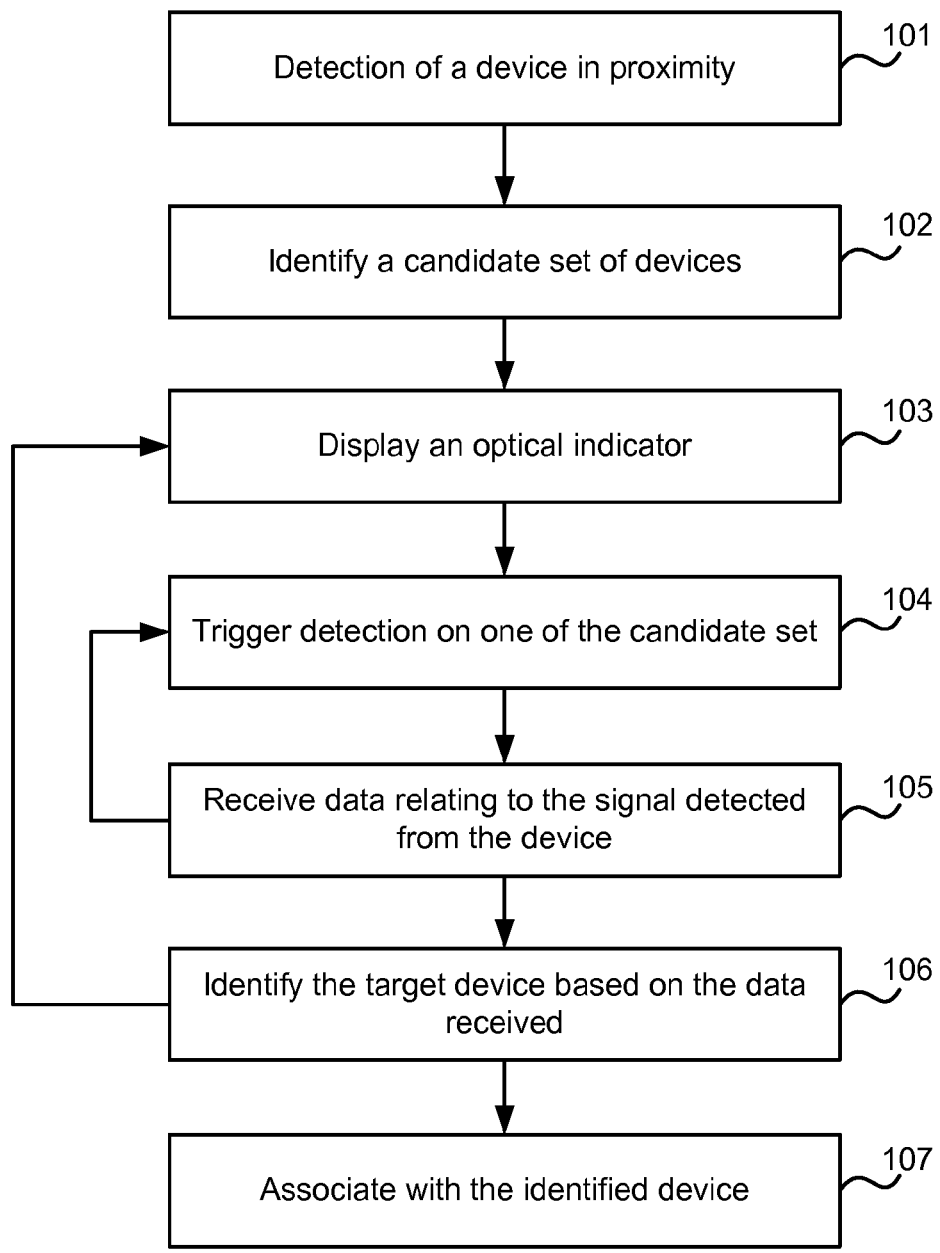
FIG. 1 shows a flow diagram of an example method by which a first wireless enabled device can uniquely identify a second wireless enabled device.
Figure 2:
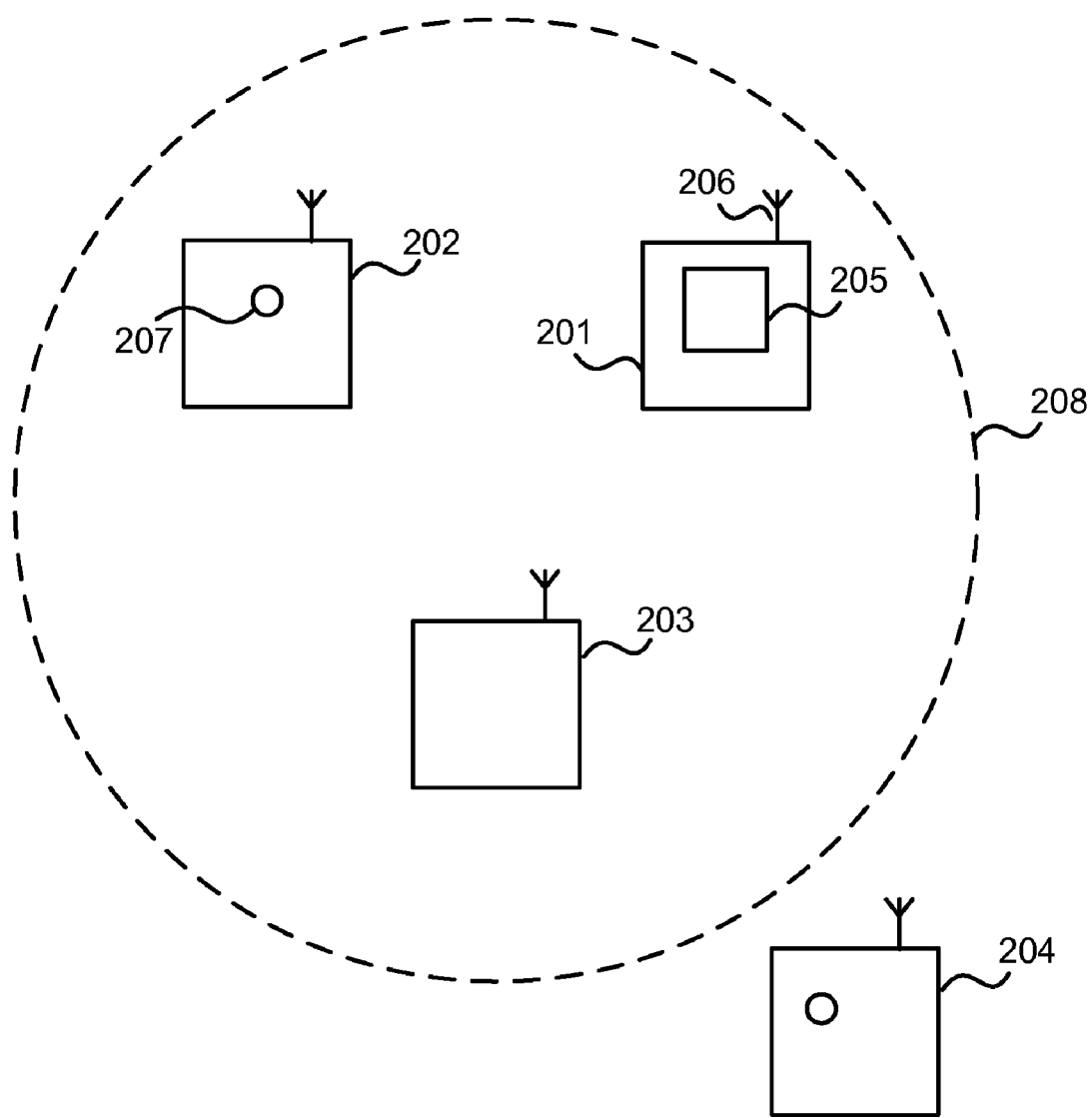
FIG. 2 is a schematic diagram of a plurality of wireless enabled computing devices.
Figure 3:
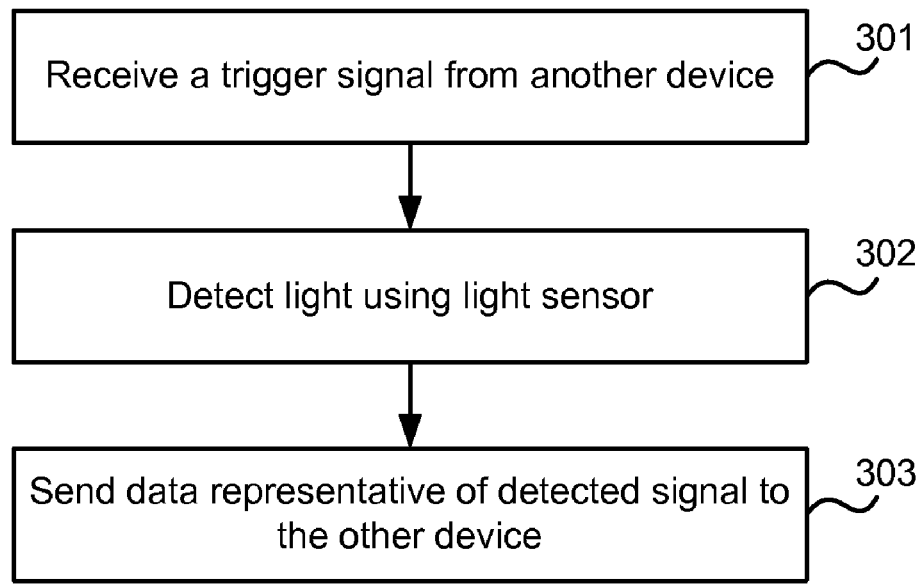
FIG. 3 is a flow diagram of an example method of operation of a target device.

FIG. 1 shows a flow diagram of an example method by which a first wireless enabled device, referred to herein as the 'initiator device', can uniquely identify a second wireless enabled device, referred to herein as the 'target device', which is in proximity to the first device without requiring the second wireless enabled device to be tagged or otherwise physically augmented. Having identified the wireless identifier (or address) of the target device, the initiator device can use the wireless address to perform bidirectional communication with the target device over a wireless link. For example, the initiator device may associate (or pair) with the target device, synchronize data with the target device or perform any other interaction with the target device over a wireless link. This method can be described with reference to FIGS. 2 and 3. FIG. 2 is a schematic diagram of a plurality of wireless enabled computing devices 201-204 and FIG. 3 is a flow diagram of an example method of operation of the target device. The wireless enabled computing devices 201-204 may be mobile telephones, PCs, interactive surfaces or any other kind of wireless enabled computing device and various examples are described in more detail below.

The initiator device 201, which comprises a light source 206 such as a display or one or more LEDs, detects a target device 202 in physical proximity to the initiator device (block 101). This physical proximity detection may be performed in any suitable way, such as by using touch sensitive technology or through user input, and various examples are described in more detail below. The initiator device 201 uses its wireless transmitting and receiving modules (as indicated in FIG. 2 by antenna 206) to identify a set of nearby wireless devices (indicated by dotted line 208, block 102) which may include the target device. This set is referred to herein as the 'candidate set' and may comprise the wireless identifiers of all the devices which are within the wireless range of the initiator device. This process of identifying the candidate set (block 102) may use standard discovery methods, such as the Bluetooth or WiFi discovery protocol, and is described in more detail below.

Having identified the candidate set of devices, one of which may be the target device 202, the initiator device displays an optical indicator, such as a light pattern (block 103) using its light source 206. This optical indicator (which may be a light pattern) may use visible or infrared (IR) light and may be any pattern, such as a single color (which may also be referred to as uniform light, e.g. an entire display of a single color), a region of a certain color (e.g. a circle of a particular color), a scanning light spot, a sequence of colors, a pattern of varying intensity etc. The displaying of the optical indicator (in block 103) may comprise statically displaying the same pattern all the time (as described below), displaying a single pattern (e.g. a single color or a region of color) for a period of time, or displaying a dynamic pattern, which changes over time (e.g. a scanning spot/lines or a sequence of colors). Where the approximate location of the target device is known (e.g. the position of the target device on the touch sensitive display of the initiator device may be known), the optical indicator (such as a light pattern) displayed may be dependent upon this location. Various examples are described in more detail below, but for the purposes of explanation only, for this example it will be considered that the initiator device displays a red circle on its display in the area in which the target device was detected (in block 101).

The identification of the target device from the candidate set is achieved by iteratively triggering devices in the candidate set to use any light sensor 207 in the particular device to detect a signal (blocks 104, 301 and 302) and to send data representative of the detected signal back to the initiator device (block 303). The devices in the candidate set may not all comprise a light sensor (e.g. device 203), but for the purposes of this explanation the target device 202 comprises a light sensor 207. The situation where the target device does not comprise a light sensor is described below. The light sensor 207 may be a camera, a photodetector or any other means of detecting light incident on the device. Depending on the light sensor, the detected signal may comprise the intensity and/or wavelength of the detected light or a captured image etc. The data representative of the detected signal which is sent to the initiator device by the target device may be the same as the detected signal (e.g. the intensity, wavelength or captured image) or the detected signal may be processed to generate the data representative of the detected signal (e.g. such that the data details the color detected and/or the time that the color was detected). Examples of this are described in more detail below.

On receipt of the data from a device in the candidate set (block 105), the data can be used to identify whether the candidate device is the target device (block 106). This is achieved by using the data to determine whether the light sensor on a particular candidate device detected the optical indicator (or a portion of the optical indicator) displayed by the initiator device; the target device being one which did detect the optical indicator (or part thereof). In this particular example, the determination can be performed through analysis of the data to determine which of the candidate set detected the red circle.

Each of the candidate set of devices may be triggered in turn (in block 104) or alternatively all the candidate set may be triggered substantially simultaneously and the data received from all the candidates may be analyzed to identify the target device. Where the members of the candidate set are triggered sequentially, the initiator device may stop triggering once a device is identified which detected the optical indicator or alternatively, the initiator device may continue to trigger each of the members of the candidate set. The sequence used to trigger members of the candidate set may be set to trigger candidate devices in order of signal strength (from high to low) or based on other criteria. Examples of suitable criteria are described in more detail below in relation to filtering the candidate set, and include: device class, device orientation, motion of the device and history of previous associations.

If there is any ambiguity in determining which of the candidate set is the target device, (e.g. more than one device saw the red circle or a part thereof), the process may be repeated using the same optical indicator (e.g. using the same light pattern) or a different optical indicator displayed by the initiator device (e.g. a smaller pattern, a different sequence etc), until a device from the candidate set has been uniquely identified as the target device 202. Various examples of different optical indicators are described in more detail below.

Having identified the target device (in block 106), the wireless identifier of the target device 202 is known and the initiator and target devices 201 and 202 may perform bidirectional communication over a wireless link (block 107). In an example, the most recent photograph taken by the target device may be transferred to and displayed on the initiator device.

The identification method, as shown in FIG. 1, may be initiated by the sensing of another device (the target device) in proximity to the initiator device (block 101) and this proximity sensing may use any suitable technology. In an example, the initiator device may comprise an interactive surface on which the target device is placed. In this example, touch sensing may be used to detect the target object on its surface and in this example, the location of the target device on the surface is known. Any suitable touch sensing technology may be used which is capable of detecting a device placed on its surface, such as optical touch sensing (e.g. by detecting shadows caused by objects on the surface or by detecting light reflected back by objects on the surface). In another example, a pressure switch, weight sensor, proximity sensor, light sensor or microphone may be used to detect when the target device is placed onto the initiator device (or onto a peripheral device associated with the initiator device) or otherwise brought into proximity to the initiator device. In a further example, IR or visible emitters and receivers may be used (e.g. placed around the edge of a display) and presence may be detected when the beam from a transmitter to a receiver is broken by the presence of an object. This beam-break technique may also provide approximate position information for the target object.

In an example, the proximity sensing may use wireless discovery techniques. The discovery protocols may run substantially continuously or operate periodically to determine whether other wireless devices are in close proximity. Use of such techniques combines the proximity sensing and identification of a candidate set (blocks 101 and 102) into a single operation.

In other examples, the method of FIG. 1 may be triggered by a user. For example, a user may press a button on the initiator device to initiate the identification of a candidate set of devices (in block 102). This button may be a physical button or a soft button (e.g. on a touch sensitive display or which is pushed using a mouse). The user may, alternatively, cause the target device to emit a sound (e.g. a beep) or to vibrate and this sound/vibration may be detected by the initiator device.

In another example, the method may be triggered by sending a message to the initiator device via a communication channel, such as an SMS (short messaging service) message. The communication channel used is a different channel to that which will subsequently be used for device discovery and pairing. In such an example, a user may send an SMS message (also known as a 'text message') from the target device to the initiator device. This may trigger the initiator device to identify a candidate set of devices. This may be useful in some applications where an SMS number of the initiator device is known or may be published or advertised (e.g. for public displays). Whilst data transfer could occur between the initiator device and the target device using the cellular network (i.e. the same network as used to send the SMS message), this can be expensive and may be a low data rate link. Use of a direct wireless link (e.g. Bluetooth or WiFi) may be less expensive (e.g. free in many cases) and faster.

Depending on what technique is used for proximity detection or to otherwise trigger the identification of the candidate set, the initiator device may or may not obtain approximate location information for the target device. In the case of a touch sensitive display the location of every device on the display including the target device is known at the candidate set selection stage. In other examples, signal strength may be used to determine an approximate location, for example signal strength of wireless signals. WiFi or Bluetooth® signal strength may, for example, be used where an array of access points is provided surrounding the display. WiFi may be more appropriate for very large displays and Bluetooth® for smaller displays. An array of RFID may alternatively be provided underneath the display to detect signal strength of particular IDs. In further examples, time of flight techniques may be used to provide an approximate location of the target device, e.g. using acoustic, ultrasonic, radio or optical signals.

Any wireless technology may be used to identify a candidate set of devices and for subsequent communication with devices within the candidate set (blocks 104, 105, 301 and 303). For example, Bluetooth, WiFi, Zigbee, X10 or any other short-range wireless communication technology may be used.

As described above, the candidate set of devices (identified in block 102) may comprise all those devices which are within wireless range of the initiator device. However, in some applications and locations this may comprise a large number of devices, particularly where the range of the wireless technology used is more than a few meters. In some implementations, the set of those devices in range of the initiator device may be filtered to create the candidate set. For example, the set of devices in range may be filtered according to signal strength so that that the devices which are furthest from the initiator device (i.e. have the weakest signal strength) are excluded from the candidate set. Other filter criteria may be used, such as:

device class—for example to select only devices which are mobile telephones. In a Bluetooth® example, each device has a device class (type of device and services it provides) and the device type identifier is typically retrieved during device discovery (e.g. in block 102). The device class is separated in three parts: the Service Class and the Major and Minor device class. A mobile telephone will typically have a Service Class of 'Object Transfer and Telephony' with a Major class of: 'Phone' and a Minor class of: 'Cellular'. In contrast a printer (which may also be Bluetooth enabled and discovered), will have a Service Class of 'Rendering and Object Transfer', a Major class of 'Imaging' and a Minor class of 'Printer'."

device orientation—for example to select only devices in an orientation which corresponds to being placed on the surface (e.g. in a horizontal orientation, typically)

motion of the device—for example to exclude all devices which are in motion history of previous associations—for example the initiator device may initially select devices which have previously associated (or paired) with the initiator device. If this fails to identify the target device, a candidate set of devices which have no history of previous association may be used subsequently.

As described above, these filter criteria may in addition, or instead, be used to determine the order in which devices within the candidate set are triggered (in block 104).

As described above, the initiator device comprises a light source 205 that is capable of displaying an optical indicator, such as a light pattern. This optical indicator may be a flash of a single color or may be a more complex or detailed pattern and various examples are described below. Most computing devices include a display (such as an LCD) and in many examples the light source 205 may be a display. Use of a display enables complex optical indicators (e.g. complex patterns) to be used, and where the location of the target device on the display is known, the optical indicator can be targeted at the target device. However, in some examples, the light source may comprise one or more LEDs. A light guide and diffuser may be used, in some implementations, to spread the light emitted by the one or more LEDs in order that the target device does not need to be accurately positioned with respect to the light source. In another example, the light source may comprise a projector.

As described above, the optical indicator used may be dependent on the light source used to produce the optical indicator and on whether the location (or an approximate location) of the target device is known. Where the light source comprises one or more LEDs, the optical indicator may comprise one or more flashes of a single color of light or of a sequence of colors. Where the light source comprises a display, the displayed image (which is the optical indicator) may be a single color (over the entire display), a region of color (as in the red circle example described above), an icon or other pattern. In most embodiments, the optical indicator used is relatively simple such that it does not require the target device to focus. This is particularly relevant where the light sensor is a camera device and the target device is placed in contact with (or close to) the light source (e.g. on the display). In such a situation, the camera may not be able to focus on the optical indicator. In other examples, the light sensor may not be provided with means for focusing. In further examples, however, the optical indicator may be a more detailed pattern or icon.

Where the light source is a display and the location of the target device is known, the optical indicator may comprise a region of color displayed underneath the target device. As the location of the camera within the target device may not be known, the region may need to be as big as the detected shape and size of the target device. Furthermore, as the detected shape and size of the target device may be dependent on the detection technology used, the detected shape may not be the whole shape of the device (e.g. reflective IR will not detect matt black portions of a mobile device), the region of color displayed may be larger than the detected shape and size of the target device.

Figure 4:
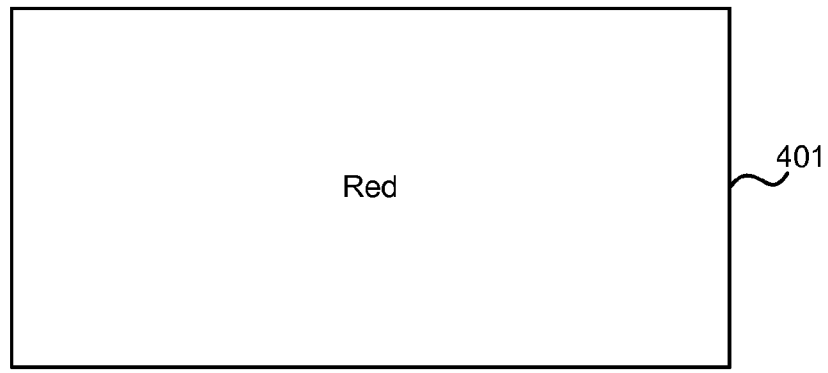
FIGS. 4 and 5 show example optical indicators.
Figure 4:
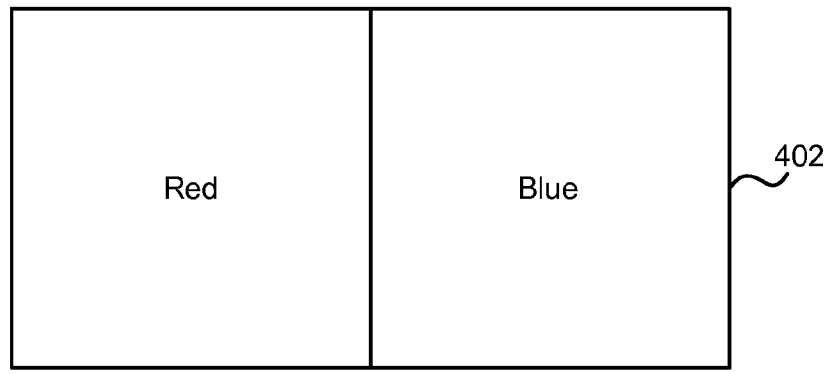
Figure 4:
Figure 5:
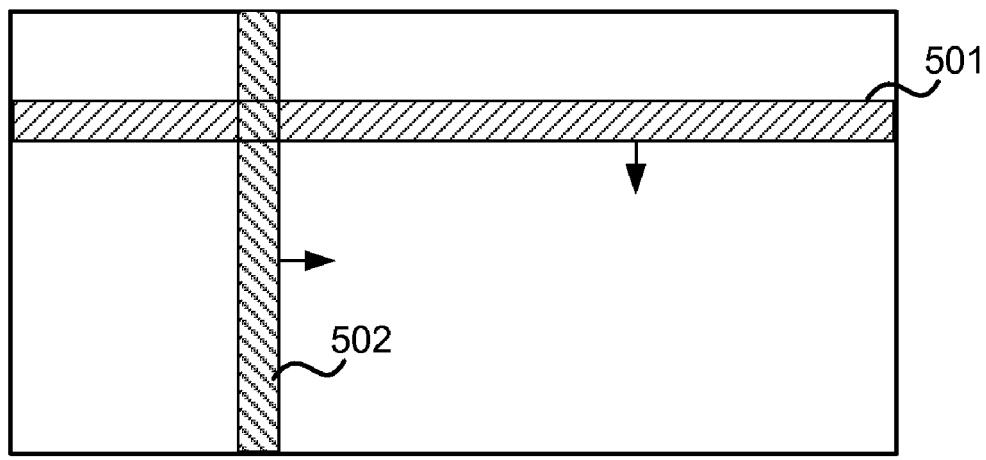

A display may also be used to display a sequence of colors or other changing pattern (as the optical indicator) and where the location of the target device is not known, an optical indicator may be displayed which enables the initiator device to determine an approximate location. A simple example of such an optical indicator is shown in FIG. 4 which shows three successive images which may be displayed. In the first image, 401, the whole screen is red, in the second, 402, the screen is bisected vertically into a red half and a blue half and in the third, 403, the screen is bisected horizontally into a red half and a blue half. If the target device is triggered to perform light detection (block 302) three times or for a period of time covering the display of the sequence of three images, the target device can be located within one of the four quadrants of the display depending on the detected sequence of colors (e.g. all red is top left quadrant). In other examples, bars of colors may be displayed which move across the screen, as shown in FIG. 5. In this example, two bars 501, 502 of different colors may be displayed, one of which traverses horizontally (bar 502, as indicated by the arrow) and one of which traverses vertically (bar 501, as indicated by the arrow). The signal detected by a candidate device may be used to determine when and if the bars were visible using the light sensor and from this the target device, and its location, can be identified.

Another example of an optical indicator which may be used is a high intensity spot which may be scanned across the display. In this example, the target device may determine the time at which the bright spot was detected by the light sensor and this information may be used by the initiator device to determine the location of the target device with respect to the display area (in addition to identifying the target device from the candidate set of devices). The timing information may also enable the initiator to distinguish between multiple devices in the candidate set which have a light sensor which can image the display, e.g. two wireless enabled devices which are placed on an interactive surface. These multiple devices may each be target devices, or alternatively, only one may be a target device.

The optical indicator displayed may be the same each time the method is performed or different optical indicators may be used each time. For example, the color displayed (e.g. in a circle on the display where the target device is located) may be selected substantially at random. This may be useful where there are two initiator devices within wireless range of each other so that if they both initiate the method at the same time, they display different optical indicators and hence it is possible to distinguish between target devices for each initiator device. Alternatively, the two initiator devices may be synchronized or otherwise communicate such that only one initiator device displays an optical indicator at any one time.

Whilst the above description refers to use of visible light and different colors in displaying the optical indicator in other examples, IR light (e.g. bright IR) may be used or grayscale light patterns may be used. Different wavelengths within the IR band may also be used.

Although the above description refers to optical indicators which may be dynamically displayed by the initiator device (i.e. is displayed for a short period of time), in other examples the optical indicator displayed may be static and may be displayed continuously or for long periods of time. In an example, the optical indicator may be provided by a fixed display (e.g. an advertising billboard). Where the light sensor is a camera, the fixed display need not be backlit, however if target devices are used which comprise photodetectors, the fixed display requires rear illumination.

As described above, the target device comprises a light sensor 207, which comprises a device that is capable of detecting one or more properties of the optical indicator displayed by the initiator device. Many computing devices include a digital camera and this may be used as the light sensor 207. In other examples, a photodetector may be used as a light sensor. Where the target device includes an optical fingerprint reader, the sensor in this reader may be used as the light sensor 207. An optical fingerprint reader may also be used as a light source where included in an initiator device. The light sensor may capture instantaneous data (e.g. a still image) or a may capture a stream of data over a short period of time (e.g. a short video).

The triggering of light detection (in block 302) may be dependent upon sensor information or other conditions within a candidate device such that not all candidate devices receiving a trigger signal (in block 301) may actually detect light (in block 302). For example, where the initiator device knows the orientation of the target device (e.g. in an interactive surface example, the initiator device knows that the device is horizontal), the trigger message may indicate that devices which are not horizontal (as determined by sensors within the candidate devices) should not detect light or should ignore the trigger message. In another example, a candidate device may only implement the trigger message and detect light if its keypad lock is off. Use of sensor data or other conditions may therefore be used to reduce the number of candidate devices, other than the target device, which detect light (e.g. capture an image) and send data representative of the detected signal back to the initiator device.

As shown in FIG. 3, the target device (or any other device in the candidate set) is triggered to detect light using any available light sensor (block 302), typically using a camera within the target device. The data which is then communicated back to the initiator device (in block 303) may comprise the raw sensor data (e.g. the image captured by the camera) or the data may first be processed. Examples of processing which may be performed include: determination of the color (or sequence of colors) detected, determination of the time at which a color or colors are detected, determination of the intensity of light detected etc. In the simple example used above, the target device may send the initiator device an image file which comprises a red image (from the red circle) or the target device may process this image and send data indicated that the detected image was red to the initiator device. In another processing example, the target device may reduce the size of the image to a few pixels (e.g. 1-10 pixels).

Whilst the raw data may provide the initiator device with more information, there may be privacy concerns where the raw data is an image captured using a digital camera. In such an instance, processing the data on the target device alleviates any privacy concerns. Use of filters on the candidate set or filters within the trigger conditions, as described above, may also alleviate privacy concerns, e.g. by filtering out devices which are not in the correct orientation and/or devices which are in motion.

In some examples, the target device may not comprise a light sensor. In such a situation, the target device may use user input to characterize the optical indicator. For example, where the optical indicator is a colored circle displayed on a surface around the target device, the user may be presented with a number of color options (e.g. Blue/Red/Green/none). The user selects the color of the circle which surrounds the device and provides the corresponding input to the target device. This selection may then be communicated to the initiator device. In another example, the user may be asked to confirm that they saw a color (rather than selecting a particular color).

The identification of the target device (in block 106) from the data provided by members of the candidate set may be performed by comparing the data received and the optical indicator displayed. Using the example above, where the optical indicator was a red circle, the match between the displayed and detected colors may be measured and any candidate device detecting red is possibly the target device. Where more than one device detected red, a second optical indicator may be displayed (e.g. a circle of a different color) and the process repeated.

A number of different examples are described below with reference to FIGS. 6-12. These examples show different types of initiator and target devices which may be used and different applications for the methods described above. It will be appreciated however, that these are just some of the possible embodiments, and aspects of any of the examples may be combined with other examples to provide further embodiments.

Figure 6:
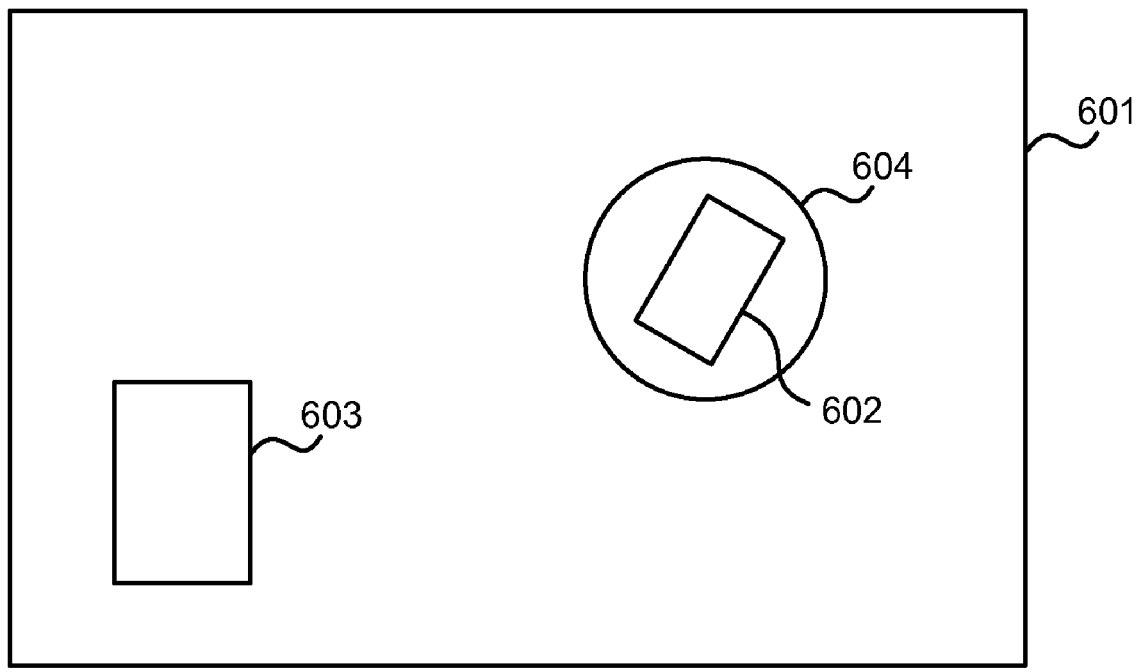
FIG. 6 shows a schematic diagram of an interactive surface with two target devices on its surface.
Figure 12:
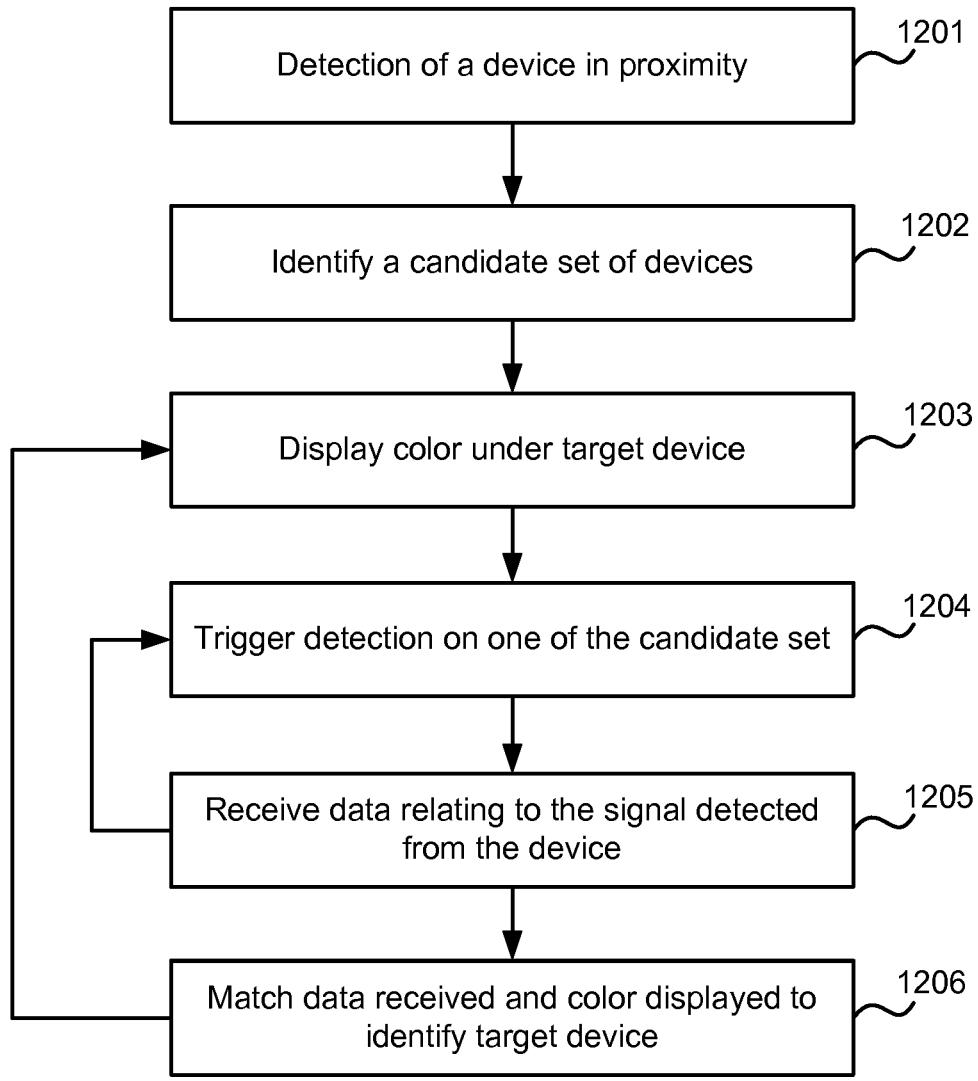
FIG. 12 shows an example method of operation of an interactive surface.

FIG. 6 shows an example in which the initiator device is an interactive surface 601 and an example method of operation is shown in FIG. 12. The interactive surface may be touch sensitive and therefore is able to detect one or more wireless enabled devices 602, 603 when they are placed on the surface (block 1201). The interactive surface determines a candidate set of wireless devices (block 1202). This may comprise all the wireless devices which are in range, or the list of all the wireless devices in range may be filtered in some way to provide the candidate set (as described above). The interactive surface then displays an optical indicator on its display, such as a region 604 of a particular color underneath the target device (block 1203). The interactive display communicates with each of the devices in the candidate set to trigger image capture (or other form of light detection) by the devices (block 1204). As described above, a device from the candidate set may either send the captured data (e.g. the captured image) or other data representative of the captured data (e.g. the color seen) back to the interactive surface (received in block 1205). The target device 602 can then be identified by matching the detected color (as determined from the data received in block 1205) to the particular color displayed (block 1206). If more than one of the candidate devices detected the particular color, the process (blocks 1203-1206) can be repeated to enable unique identification of the target device. For example, the interactive display may display a second optical indicator comprising a circle of a different color and the size of the circle may be smaller to reduce the chance of it being seen by more than one device. Where there is more than one target device (e.g. devices 602 and 603), the process (e.g. blocks 1203-1206 or the entire process) may then be repeated for the other target device 603. Alternatively, the two target devices may be identified in parallel by displaying, for example, two circles of different colors, one under each target device (in block 1203).

In another example, the initiator device may comprise a display which is not touch sensitive (e.g. an LCD monitor). In such an example, the proximity detection (in block 101) may be performed using wireless discovery techniques, using a camera or any other suitable technique. For example, IR emitters and receivers may be placed around the edge of a display and presence may be detected when the IR beam from a transmitter to a receiver is broken by the presence of an object. Alternatively, the process may be triggered by a user (e.g. pressing a button on the initiator device) which results in the initiator device identifying a candidate set of devices in proximity (block 102). Where the display is not touch sensitive the initiator device may not have any location information to enable it to tailor the optical indicator displayed (in block 103) to the position of the device requiring identification. The initiator device may therefore display an optical indicator which comprises a whole screen of a particular color or a sequence of colors etc. Where a sequence of colors is used, the devices in the candidate set may be triggered to perform a sequence of detection operations (e.g. to capture multiple still images) or to detect the light for a period of time (e.g. to capture a video image) and this data may be used to uniquely identify a wireless device which is in proximity to the initiator device and which can view all of, or a part of, the display. This device which is identified is the target device. Dependent on the optical indicator used, the location of the target device with respect to the display may also be determined (e.g. as described above with reference to FIGS. 4 and 5).

In another example, the light source may be a projector which projects the optical indicator (in block 103). The optical indicator may be detected directly by the target device (in block 302), i.e. by the projector shining onto the light sensor, or alternatively the target device may detect the optical indicator once projected onto a surface (e.g. a wall or a ceiling). Projection of an optical indicator onto the ceiling may enable identification of a target device which is placed on a surface with its camera face up, rather than the face down configuration as shown in FIG. 6.

Figure 7:
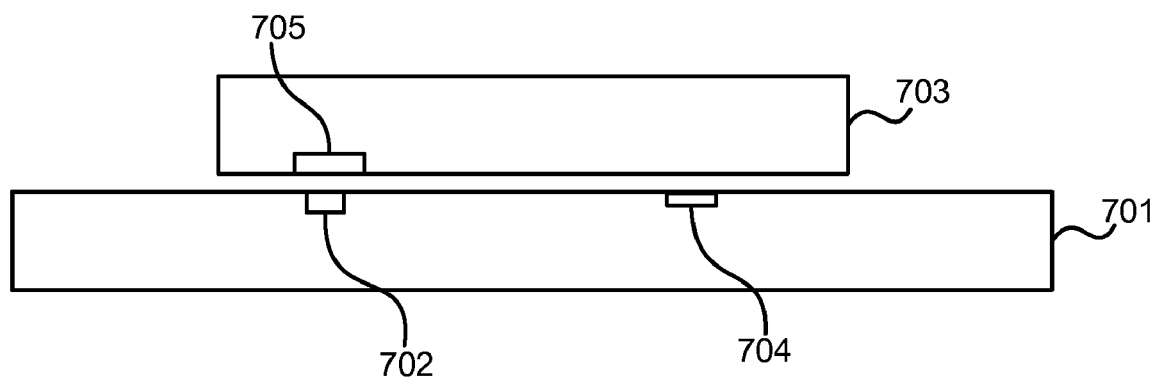
FIG. 7 shows a schematic diagram of a synchronization pad.

FIG. 7 shows an example in which the initiator device comprises a special pad 701 which may be used for synchronizing devices. This pad may be a peripheral device for a computing device. The pad comprises a light source 702 which may, for example, comprise a multi-color LED, or one or more single color LEDs. The pad may be able to detect another device 703 (the target device) placed on its surface using any suitable technique, such as an IR proximity sensor 704. Alternatives to a proximity sensor include, but are not limited to, a pressure switch, a contact sensor and a light sensor. Alternatively a button may be provided for a user to push when placing a device on the pad.

The pad uses the method of FIG. 1 to distinguish the target device 703 which is on the pad from any other wireless enabled devices which may be within wireless range of the pad. The optical indicator is produced (in block 103) by the light source 702 and is detected (in block 302) by a light sensor 705 (e.g. a camera or photodetector) in the target device 703. In order to increase the size of the optical indicator which is produced by the one or more LEDs (or other sources) within the pad, a light guide and a diffuser may be used. This removes any requirement to place a device in a particular location on the pad. The pad may be used for other functions, in addition to synchronizing devices, such as a mouse mat and/or for charging the target device 703 using inductive charging techniques. Where the pad includes an optical fingerprint sensor, this may be used for proximity sensing and/or displaying the optical indicator.

In a variation on that shown in FIG. 7, the situation may be inverted such that the pad 701 is the target device and includes a light sensor and the device placed on the pad 703 is the initiator device and includes a light source. For example, the pad may comprise a photodetector and the initiator device may be a mobile telephone with the display used as the light source.

Figure 8:
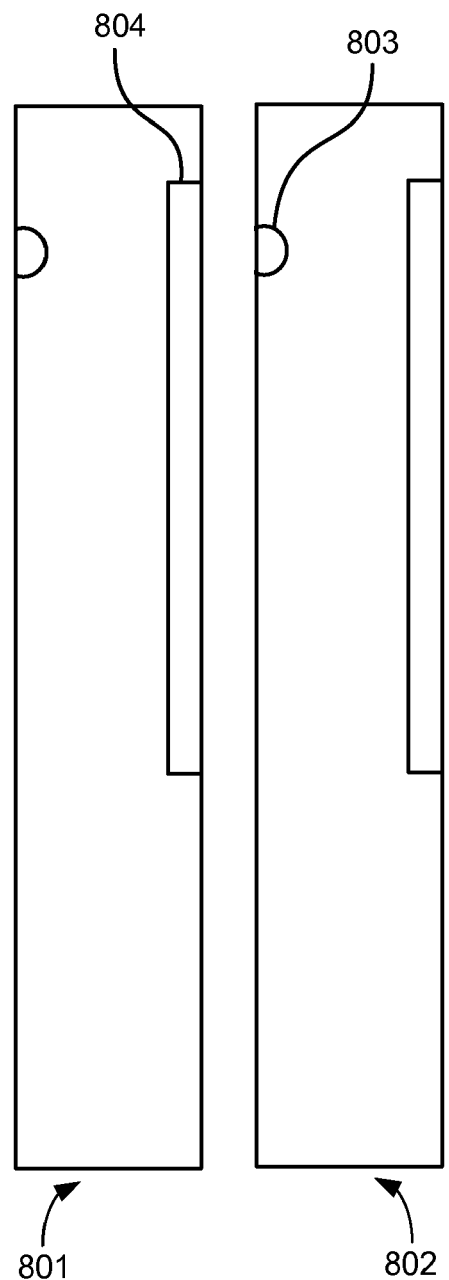
FIG. 8 shows a schematic diagram of two mobile devices.
Figure 9:
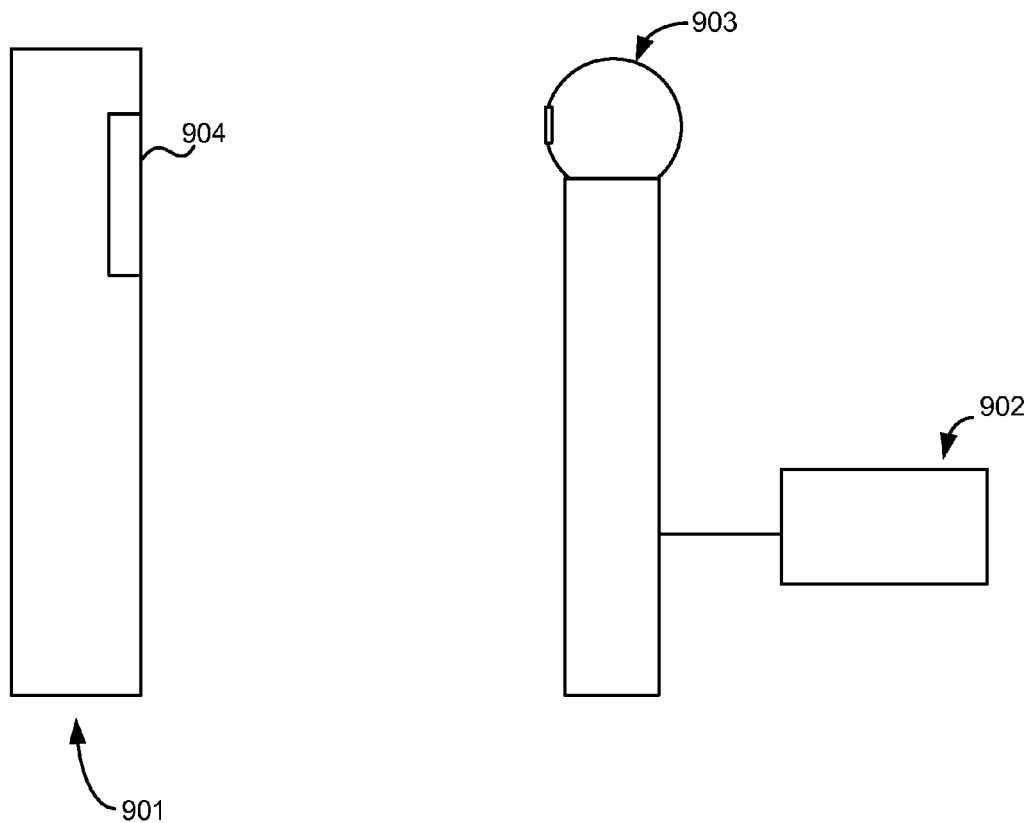
FIG. 9 shows a schematic diagram of a mobile device and a desktop PC.

FIGS. 8 and 9 show two examples where the initiator device is a mobile computing device, such as a mobile telephone. The methods described above may be used to pair the device with another mobile device (as shown in FIG. 8) or with a non-mobile device, such as a desktop PC (as shown in FIG. 9).

FIG. 8 shows two mobile devices 801, 802, each comprising a camera 803 and a display 804. The two devices are held together such that the camera of the target device 802 is in front of the display of the initiator device 801. The display of the initiator device is used to display an optical indicator (block 103), which may comprise a screen of a single color, and this is detected by the camera of the target device (block 302). Other devices in the candidate set will be unlikely to be able to detect the optical indicator which is displayed by the initiator device as it is mainly obscured by the target device, although if there is any uncertainty (e.g. because two candidate devices detect the color displayed on the initiator device), a second optical indicator may be displayed by the initiator device.

FIG. 9 shows a mobile device 901 (the initiator device) and a non-mobile device 902 (the target device), which comprises a camera 903. In this example, the non-mobile device comprises a desktop PC and the camera is a web-cam. A display 904 on the mobile device 901 is used to display an optical indicator (block 103) which is detected by the camera 903 (block 302).

Figure 10:
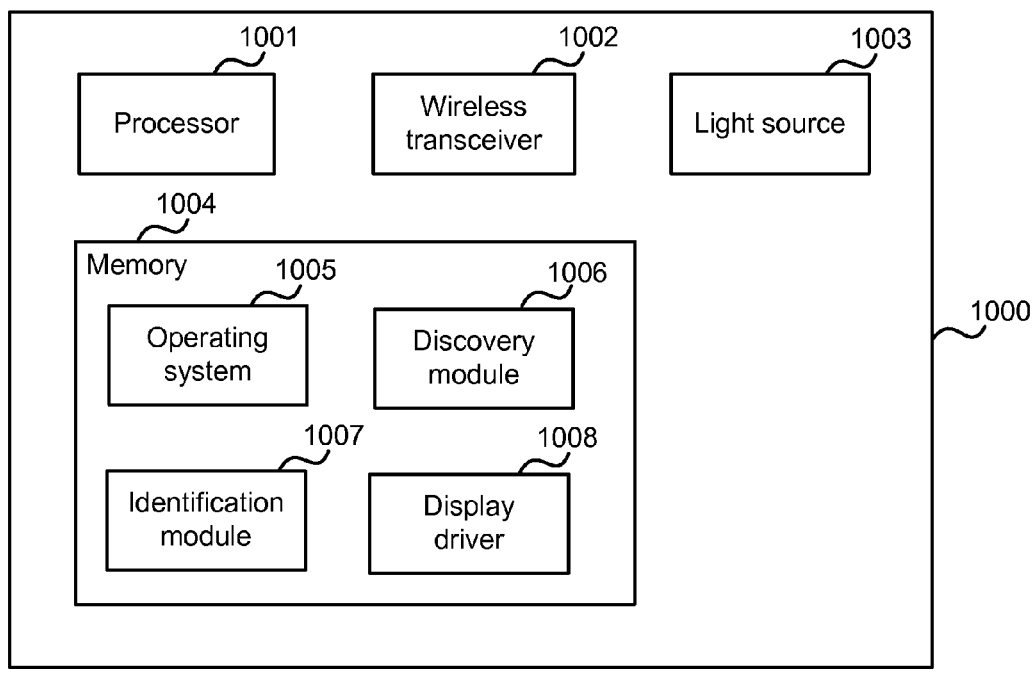
FIG. 10 illustrates an exemplary computing-based device which may comprise an initiator device.

FIG. 10 illustrates various components of an exemplary computing-based device 1000 which may be implemented as any form of a computing and/or electronic device, and which may comprise an initiator device. Computing-based device 1000 comprises one or more processors 1001 which may be microprocessors, controllers or any other suitable type of processors for processing computing executable instructions to control the operation of the device in order to identify a target device (and perform any subsequent pairing or synchronization etc).

Platform software comprising an operating system 1005 or any other suitable platform software may be provided at the computing-based device to enable application software to be executed on the device. The application software may comprise: a discovery module 1006, arranged to identify a candidate set of devices, an identification module 1007, arranged to identify the target device from those in the candidate set based on the data received from each device, and a display driver 1008, arranged to generate the optical indicator and cause it to be displayed.

The computer executable instructions may be provided using any computer-readable media, such as memory 1004. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

The device further comprises a wireless transceiver 1002 (or separate wireless transmitter and receiver modules) and a light source 1003 which is used to display the optical indicator generated by the display driver 1008. As described above, the optical indicator generated may be uniform light of a single color, a region of color, a sequence of colors, a dynamic pattern, scanning spots/lines, a detailed pattern etc.

Figure 11:
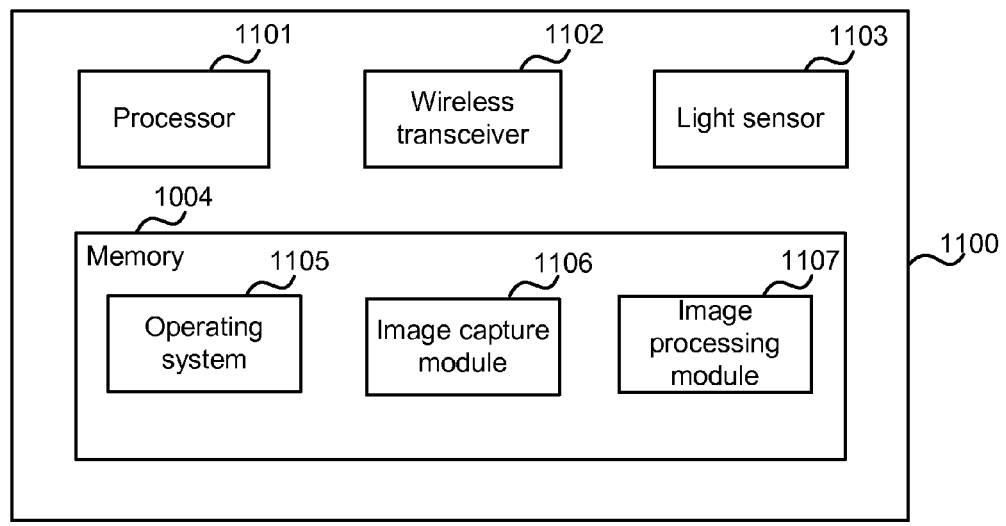
FIG. 11 illustrates an exemplary computing-based device that may comprise a target device.

FIG. 11 illustrates various components of an exemplary computing-based device 1100 which may be implemented as any form of a computing and/or electronic device, and which may comprise a target device. Computing-based device 1100 comprises one or more processors 1101 which may be microprocessors, controllers or any other suitable type of processors for processing computing executable instructions to control the operation of the device in order to identify a target device (and perform any subsequent pairing or synchronization etc).

Platform software comprising an operating system 1105 or any other suitable platform software may be provided at the computing-based device to enable application software to be executed on the device. The application software may comprise: an image capture module 1106, arranged to capture the signal detected by the light sensor when a trigger is received from an initiator device, and an image processing module 1107, arranged to process the detected signal and generate the representative data which can be sent to the initiator device.

The computer executable instructions may be provided using any computer-readable media, such as memory 1104. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The device further comprises a wireless transceiver 1102 (or separate wireless transmitter and receiver modules) and a light sensor 1103.

It will be appreciated that only those components of the computing devices 1000 and 1100 which are necessary for the description of an initiator device and a target device respectively and their operation are shown in FIGS. 10 and 11. The computing devices 1000 and 1100 may comprise other elements, such as one or more inputs (e.g. which are of any suitable type for receiving media content, Internet Protocol (IP) input, etc), a communication interface, one or more outputs (such as an audio and/or video output to a display system integral with or in communication with the computing-based device), etc.

The methods described above enable an initiator device to uniquely identify a target device from a set of wireless devices which are within range of the initiator device. This may be useful for automatic identification of wireless devices or where there are large numbers of wireless devices within range and therefore it may be difficult to identify the target device using other means (e.g. the list of devices presented to a user might be unfeasibly large).

The methods also, in many embodiments, do not require any user input and can therefore be performed automatically. This may be useful in many applications, including where mobile devices (such as mobile telephones) are used as payment tools. For example, a user may hold their mobile telephone up to a ticket machine or kiosk etc in order to purchase an item (e.g. a ticket). The ticket machine needs to uniquely identify the mobile telephone which is being used for the transaction from all those in the vicinity and the methods described herein may be used. In an example, a synchronization pad (as shown in FIG. 7) or any display on the ticket machine may be used to provide the optical indicator.

The methods described herein may be used to enable users to connect to public displays to receive, transmit or share data. In such an example, the public display may be the initiator device and the method may be triggered by holding a mobile device against a defined portion of the display, pressing a button on the display, SMS messaging a number displayed on the display etc. The public display may have a defined region where it displays the optical indicator for use in pairing of devices.

In a further example application, the initiator device may be a digital photograph frame. Use of this method may enable association between the frame and a camera device (which may be a mobile telephone or other device which includes a camera). The association may enable automatic transfer of images to the digital photograph frame and this transfer may be automatic (e.g. on proximity sensing of the camera device) or may require user input (e.g. pressing a button on the frame to trigger the methods described above).

Figure 13:
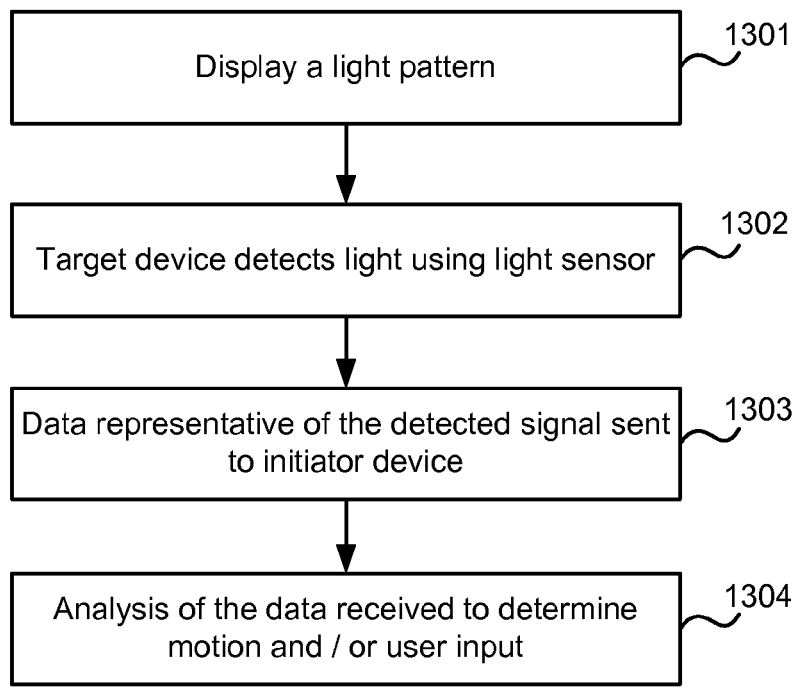
FIG. 13 shows a method of tracking movement and/or determining user input.

Having used the methods described above to associate an initiator device and a target device, the methods may further be used to track movement of the target device with respect to the initiator device and/or to provide inputs to the initiator device. FIG. 13 shows a method of tracking movement and/or determining user input. The initiator device displays a light pattern (block 1301) which may be the same as the optical indicator as described above (and therefore may be a continuation of block 103) or may be different (e.g. a new light pattern which is displayed). Examples of light patterns are described below with reference to FIG. 14. The target device detects the light pattern (block 1302) and sends data representative of the detected signal to the initiator device (block 1303). The detection (in block 1302) is similar to the detection described above and may be triggered by the initiator device (e.g. as a result of the trigger message generated in block 104 or a subsequent trigger message sent only to the target device). Any processing performed on the detected data before sending it to the target device may be similar to that described above in (in relation to FIG. 3). The data received by the initiator device is then analyzed to determine the motion of the target device and/or to identify a user input (block 1404). The user input may be determined directly from the detected signal (e.g. a particular color detected may be mapped to a particular input) or the user input may be determined from the determined motion (e.g. a particular movement may be mapped to a particular user input).

Figure 14:
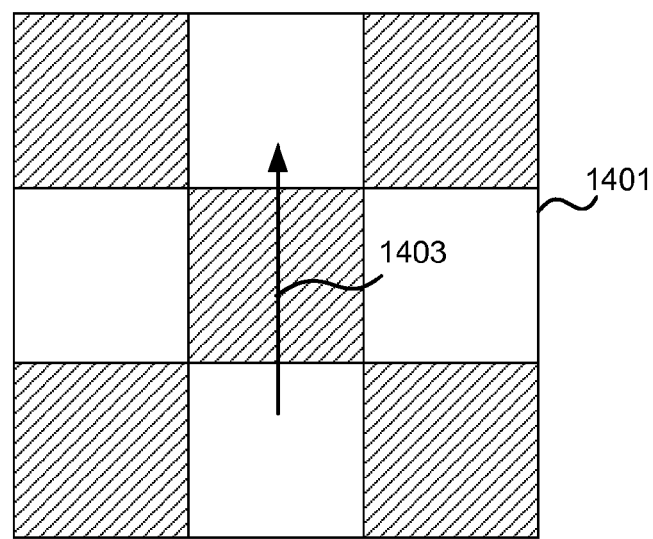
FIG. 14 shows two example light patterns that may be displayed by the initiator device in order to detect motion of the target device and/or to provide a user input.
Figure 14:
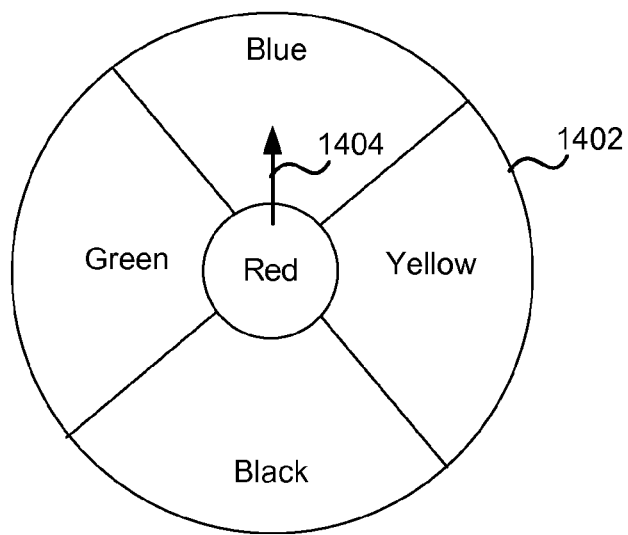

FIG. 14 shows two example light patterns which may be displayed by the initiator device in order to detect motion of the target device and/or to provide a user input. A first example 1401 shows a grid of squares which may be different colors (e.g. black and white) or different intensities. When a target device is moved relative to the light pattern (e.g. as indicated by arrow 1403), the detected signal changes and from this the movement of the target device can be determined. The second example 1401 shows a circular pattern with a red centre and four outer regions of different colors. When a target device is moved, the detected color changes (e.g. from red to blue when moved as indicated arrow 1404) and from this color change the motion and/or a user input can be determined. As described above, any light pattern may be displayed dynamically or may be fixed.

Where the location of the target device is known (e.g. in the interactive surface example), the light pattern displayed (in block 1301) may be located accordingly. In the interactive display example, the light pattern may be displayed underneath the target device. When motion is detected, the position of the light pattern may stay the same or alternatively, once motion has been detected the position of the light pattern may be updated to remain in the same (approximate) position relative to the target device. For example, the second pattern 1402 shown in FIG. 14 may be tracked with the position of the target device such that motion of the target device always results in a color change from red to one of the other colors displayed (e.g. red to blue, green, yellow or black).

The methods described above with reference to FIGS. 13 and 14 enable a mobile device, such as a mobile telephone, to be used to provide a simple mouse (or other pointing device) replacement.

Having used the methods described above to associate an initiator device and a target device, the methods may be used to locate the image sensor on the target device. This may be particularly applicable to situations where the initiator device has location information relating to the target device itself from the proximity sensing (in block 101), e.g. when using a touch sensitive surface. By changing the optical indicator displayed and analyzing data representative of the detected data (in a similar manner to that shown in FIG. 13 and described above) a more precise location of the image sensor can be identified. For example, where initially a colored region is used, the size of the region may be made gradually smaller until it can no longer be detected by the target device, or the region may be gradually moved until it can no longer be detected by the target device. This may be repeated to further reduce the margin of uncertainty in the position information. This position information may be stored along with the wireless identifier (or address) of the target device for future use.

Having identified a more precise location of the image sensor, this information may be used in many ways. In a first example, where the motion of the target device is subsequently used to track the device and/or provide user input, the location information may be used to position the light pattern displayed (in block 1301). This may, for example, enable a light pattern to be displayed which is not visible to the user (because it is small and obscured by the target device) and hence does not distract the user. In another example, this may enable identification of the type of the target device (e.g. the make and model of a mobile telephone) through use of a database or look-up table relating detected shape and size of the target device, the relative position of the image sensor and the device type. In another example, transmitters within the initiator device may be used to transmit data optically to the target device. The optical signal can be directed at the image sensor directly which provides a more secure link (as third parties cannot intercept the signal) and does not distract the user.

Although the present examples are described and illustrated herein as being implemented using Bluetooth or WiFi, the system described is provided as an example and not a limitation. As those skilled in the art will appreciate, the present examples are suitable for application in a variety of different types of wireless systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples (whether methods, apparatus or otherwise) described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of identifying a target device in proximity to a first device, the method comprising:
   identifying a candidate set of devices by the first device;
   displaying an optical indicator by the first device;
   sending a message by the first device to at least one device from the candidate set of devices, said message being arranged to trigger light detection on said device;
   receiving data by the first device from said at least one device from the candidate set in response to said message, the data being representative of a detected signal on said device from said light detection of said optical indicator; and
   determining by the first device if a device from the candidate set is the target device for communication based on the data received from said device and the optical indicator displayed.

2. A method according to claim 1, wherein identifying a candidate set of devices comprises:
   using a wireless discovery protocol to identify a candidate set of devices within range of the first device and wherein each of the candidate set of devices is identified by a wireless identifier.

3. A method according to claim 2, wherein identifying a candidate set of devices further comprises:
   filtering the candidate set of devices based on defined criteria.

4. A method according to claim 1, wherein said message is arranged to trigger image capture on said device.

5. A method according to claim 4, wherein said data received from at least one device comprises one of a captured image and data generated from a captured image.

6. A method according to claim 1, wherein the method further comprises, prior to identifying a candidate set of devices:
   detecting a target device in proximity to the first device.

7. A method according to claim 1, further comprising:
   repeating the sending, receiving and determining steps until a device from the candidate set is identified as the target device.

8. A method according to claim 1, wherein said first device comprises an interactive surface and said target device comprises a device placed on the interactive surface and wherein displaying an optical indicator comprises:
   displaying a region of color on the interactive surface proximate to the target device.

9. An apparatus comprising:
   a light source arranged to display an optical indicator;
   a wireless transmitter and receiver module;
   a processor;
   a discovery module arranged to identify a set of wireless devices within range of the apparatus, each device having a wireless identifier; and
   an identification module arranged to send a message to each of the set of wireless devices to trigger light detection by each device to detect said optical indicator, to receive data representative of a detected signal indicative of said optical indicator detection from a wireless device of said set of wireless devices and to determine the wireless identifier of a device in close physical proximity to the light source using said data.

10. An apparatus according to claim 9, wherein the identification module is arranged to determine the wireless identifier of the device in close proximity by determining if said data corresponds to the displayed optical indicator.

11. An apparatus according to claim 9, wherein the light source comprises a touch sensitive display, and wherein said device in close physical proximity to the light source comprises a device in contact with said display.

12. An apparatus according to claim 11, wherein the touch sensitive display is arranged to detect a position of said device in contact with said display and wherein said optical indicator is dependent on said position.

13. An apparatus according to claim 9, wherein the light source is located within a peripheral device and the peripheral device further comprises a proximity sensor.

14. An apparatus according to claim 13, wherein the discovery module is arranged to identify said set of devices in response to detection of said device in close physical proximity using said proximity sensor.

15. An apparatus according to claim 13, wherein the light source comprises one or more LEDs.

16. One or more tangible device-readable media with device-executable instructions for performing steps in a second device comprising:

in response to receipt of a trigger message from a first device, detecting an optical indicator displayed on said first device using a light sensor; and sending data representative of the optical indicator detection to said first device wherein said first device determines whether the second device is a target device for communication based on receiving said data.

17. One or more tangible device-readable media according to claim 16, wherein the light sensor comprises a camera and wherein detecting light using a light sensor comprises:

capturing at least one image using said camera.

18. One or more tangible device-readable media according to claim 17, wherein said at least one image comprises at least one unfocussed image.

19. One or more tangible device-readable media according to claim 17, further comprising device-executable instructions for performing steps comprising:

processing said image to generate said data.

20. One or more tangible device-readable media according to claim 19, wherein said data comprises a color of said image.

* * * * *